United States Patent [19]

Ohtsuki et al.

[11] 4,389,438

[45] Jun. 21, 1983

[54] PROCESS FOR PREPARING LAMINATES

[75] Inventors: Akira Ohtsuki; Hirokichi Ishino; Hiromu Sakai; Takahiko Yamasoba; Susumu Tsuchiko; Takashi Yoshino, all of Kyobashi, Japan

[73] Assignee: Toyo Ink Manufacturing Co., Ltd., Tokyo, Japan

[21] Appl. No.: 282,343

[22] Filed: Jul. 10, 1981

[30] Foreign Application Priority Data

Jul. 22, 1980 [JP] Japan ................................. 55-99425

[51] Int. Cl.³ .............................................. B65D 37/00
[52] U.S. Cl. ............................... 428/35; 156/244.16; 156/244.22; 156/244.24; 156/244.27; 156/277; 156/306.6; 156/327; 156/334; 229/3.5 MF; 426/126; 428/416; 428/425.8; 428/461
[58] Field of Search ................... 156/244.16, 244.22, 156/244.24, 244.27, 277, 306.6, 327, 334, 313; 229/3.5 MF; 426/126; 526/226, 317, 272; 428/416, 461, 425.8, 35; 427/208, 409, 209, 410

[56] References Cited

U.S. PATENT DOCUMENTS

| | | | |
|---|---|---|---|
| 3,462,329 | 8/1969 | Beyer | 156/277 |
| 3,846,383 | 11/1974 | Uyama et al. | 526/226 |
| 4,190,477 | 2/1980 | Ossian et al. | 156/244.27 |
| 4,310,578 | 1/1982 | Katsura et al. | 156/334 |

FOREIGN PATENT DOCUMENTS

55-128455 10/1980 Japan ................................. 428/461

*Primary Examiner*—John J. Gallagher
*Attorney, Agent, or Firm*—Jordan and Hamburg

[57] ABSTRACT

A process for the preparation of laminates comprising the steps of (1) putting a thermoplastic resin sheet or film and a metal foil or sheet one upon another with a specific polyolefin type resin being interposed therebetween, (2) heating the thus interposed specific polyolefin type resin to a temperature not lower than the melting point of the specific polyolefin type resin to obtain an intermediate laminate and (3) laminating at least one of thermoplastic sheets or films and paper on the metal foil or sheet side of said intermediate laminate using therebetween an ordinary adhesive not requiring heating at a temperature not lower than said melting point at the time of lamination thereby to obtain a desired laminate. In one embodiment, this invention also relates to a foodstuff packaging container wherein the innermost layer is a polyolefin resin sheet or film.

20 Claims, No Drawings

PROCESS FOR PREPARING LAMINATES

This invention relates to a process for preparing a laminate which is excellent in hygienical property, barrier property, bond strength even after retort sterilization, and working property.

It is generally required that foodstuff packaging laminates have the following typical basic properties: (1) they are hygienically satisfactory, (2) they have good barrier property (barrier property meaning impermeableness to gases or the like), (3) they have satisfactory light-intercepting property, (4) they have high mechanical strength, (5) they are highly resistive to moisture, acids and alkalies, and (6) they may be prepared by a short-time treatment. In addition to the above properties, the laminates which will be subjected to retort sterilization are further required to have (1) satisfactory heat resistance (such as heat resistibility to a temperature of 100°–160° C. for several seconds to several ten minutes) and (2) satisfactory bond strength which will not decrease even when they contain necessary things. Thus it is difficult for a single plastics material or other single material to meet the aforesaid various requirements and, therefore, composite films or composite materials are now used as foodstuff packaging materials. These packaging materials include polyolefin, polybutadiene, ethylene-vinyl acetate copolymers, thermoplastic resins, paper, tin-plate sheets, tin-free steel and aluminum foils or sheets and, in many cases, combinations of a metal foil or sheet having particularly excellent barrier property with a thermoplastic resin are now used.

Such a combination is exemplified by a metal foil or sheet on the sides of which different kinds of resins are respectively laminated. For example, to obtain laminates for packaging foodstuffs, a metal foil or sheet is laminated on the inner side with a polyolefin resin or polyamide resin or the like having excellent hygienic properties and on the outer side with a polyester resin, polyamide resin or the like having excellent heat resistance, strength and like properties, to form a laminate having excellent hygienical property, barrier property, heat resistance, strength and like properties. The term "inner side" of a laminate as used herein is intended to mean the side which faces or contacts the foodstuffs enclosed in the laminate.

The above lamination is carried out with an adhesive, such as a polyurethane or epoxy resin adhesive, between the materials to be laminated.

However, polyurethane resin adhesives or the like are said to have the following drawbacks:

(1) In cases where laminates using such an adhesive therein are used for packaging foodstuffs, the unreacted polyisocyanate and polyol, low polymers and the like contained in the adhesive tend to transfer to the foodstuffs, this raising hygienic problems. Thus, it is undesirable that the adhesives be used inside of the layer having excellent barrier property in the laminate.

(2) In order to obtain practically satisfactory bond strength between metals and plastics films in the preparation of laminates therefrom using the adhesives, it is necessary to have the adhesives aged at ambient temperature for about one week or at 50°–60° C. for one day or more.

To eliminate the drawbacks of the conventional adhesives, the use of carboxyl group-containing polyolefin or metal compound-added carboxyl group-containing polyolefin type adhesives are being studied. These polyolefin type resin adhesives have excellent hygienic properties and are useful in producing laminates in which the component materials (metal foil, plastics films and the like) are highly securely bonded together. In order to effect such a highly secure bond, it is necessary to heat the component materials to a temperature equal to or higher than the melting point of said polyolefin type resin adhesive after they have been placed one upon another.

In the production of laminates in which the polyolefin type resin adhesives are used, a metal foil or sheet is laminated with a thermoplastic resin film, such as a polyester or polyamide film, using a polyurethane resin adhesive or the like, after which the whole is laminated at the thermoplastic resin film side with a polyolefin resin film or the like using a polyolefin type resin adhesive by being heated to a temperature not lower than the melting point of said polyolefin type resin adhesive. However, the above lamination process using the aforesaid lamination order has drawbacks including the following:

(1) The heat energy to be required for melting the polyolefin type resin adhesive is partly deprived of by the polyurethane resin adhesive or the like and the thermoplastic resin film laminated using this adhesive, thereby incurring a loss of heat energy, the polyurethane resin adhesive and thermoplastic resin film inherently needing no heat energy, thereby to incur a loss of heat energy, (2) Heating must be effected at the side of the thermoplastic resin film laminated using the polyurethane resin adhesive or the like depending on the way the heating is effected and (3) There are incurred not only a loss of heat loss but also adverse effects on the polyurethane resin adhesive or the like and the thermoplastic resin film due to the heat.

The primary object of this invention is to provide a process for producing laminates, which eliminates or solves the aforementioned drawbacks or problems. This object may be achieved by putting a thermoplastic resin sheet or film and a metal foil or sheet one upon another with at least one specific adhesive being interposed therebetween, the specific adhesive being selected from the group consisting of carboxy group-containing polyolefin type resin adhesives and metal compound-added carboxyl group-containing polyolefin type resin adhesives, heating the thus interposed specific adhesive to a temperature not lower than the melting point of the specific adhesive to form an intermediate laminate and then laminating at least one member selected from the group consisting of thermoplastic resin sheets or films and paper with said metal foil or sheet side with an adhesive therebetween not requiring to be heated to a temperature not lower than the melting point of said polyolefin type resin adhesive, thereby to obtain a final laminate.

The carboxyl group-containing polyolefin and metal compound-added carboxyl group-containing polyolefin (these being hereinafter sometimes referred to as "specific polyolefin") will be detailed hereinbelow.

The specific polyolefins may be obtained by copolymerizing an olefinic monomer, such as ethylene, propylene or butene, with at least one of $\alpha,\beta$-ethylenically unsaturated carboxylic acids and anhydrides, such as acrylic, methacrylic, itaconic, fumaric and maleic acids and anhydrides thereof, or by graft polymerizing a polyolefin, such as polyethylene, polypropylene, an ethylene-propylene copolymer or polybutene with at least one of α,β-ethylenically unsaturated carboxylic acids and anhydrides thereof. Other polymerizable monomers may additionally be used if necessary. Further, α,β-ethylenically unsaturated carboxylic acid esters may also be used as far as these esters are graft polymerized and then the ester groups of the graft polymer are saponified to be converted to carboxyl groups. In cases where the laminates obtained by the process of the present invention are intended to be used for retort-proof containers or the like requiring heat resistance, it is preferable to use a highly crystalline polyolefin, such as high-density polyethylene or polypropylene, as the polyolefin. The α,β-ethylenically unsaturated carboxylic acid may be used in an amount of preferably 0.01–50 parts by weight per 100 parts by weight of the olefinic ingredient. The use of less than 0.01 part by weight of the acid will result in effecting a weak bond between the component sheets or films of a laminate, while the use of more than 50 parts by weight thereof will result in making no improvements in a bond therebetween.

In the practice of this invention, the carboxyl group-containing polyolefins are effective, however, the metal compound-added carboxyl group-containing polyolefins are preferred since they exhibit excellent bond strength even after being subjected to sterilization in a retort. The metal compounds usable herein include carbonates, sulphates, acetates, oxides, hydroxides and organic compounds of sodium, potassium, magnesium, zinc, aluminum, copper, nickel and the like. In cases where the metal compound-added carboxyl group-containing polyolefins are to be used in laminates for packaging medicines or foodstuffs, metal compounds of sodium, magnesium, calcium, zinc and aluminum are preferable with aluminum compounds being more preferable. Among the aluminum compounds, aluminum hydroxide is particularly preferable. The metal compounds may be added to the carboxyl group-containing polyolefin in amounts of 0.05–10 parts by weight per 100 parts by weight thereof. The addition of the metal compound in these amounts will result in producing high bond strength. The use of less than 0.05 parts by weight of the metal compound will make it difficult to produce high bond strength, while the use of more than 10 parts by weight thereof will result not only in making no improvements in bond strength but also in getting the resulting specific polyolefin type resin to foam when melted by heating thereby raising problems such as a problem as to impossibility to coat said specific polyolefin uniformly on substrates such as component sheets or films to be laminated, this being undesirable.

The metal compound-added carboxyl group-containing polyolefins include, in addition to carboxyl group-containing polyolefins wherein the metal compound is dispersed, carboxyl group-containing polyolefins with which the metal ion is coordinate bonded to form a salt and those with which the metal ion is crosslinked. A third ingredient such as polybutadiene may also be used in the synthesis of the specific polyolefins. However, such third ingredients must be those which will not have adverse effects on the bond strength and the like of the resulting specific polyolefin type resin.

The specific polyolefin type resins may be obtained by a few methods comprising heating, mixing and other steps as indicated below.

A specific (carboxyl group-containing) polyolefin and a metal compound both as previously mentioned are heated to about 100°–220° C. and mixed together at this temperature for about 5–120 minutes to obtain a homogeneous mixture. Alternatively, a polyolefin, an α,β-ethylenically unsaturated carboxylic acid and a metal compound may be mixed together under heat to carry out graft polymerization. In some cases, a non-modified polyolefin or a resin having excellent hygienic properties may additionally be used.

More particularly, the specific polyolefins used in the present invention may be prepared by a few methods comprising heating, mixing and other steps. The preferable methods are as illustrated below. The materials used in the preparation of the specific polyolefin type resins are expressed herein by a polyolefin (A), an α,β-ethylenically unsaturated carboxylic acid or anhydride thereof (B) and a metal compound (C).

(1) A method comprising adding the compound (C) to a heated mixture of the compounds (A) and (B),
(2) A method comprising adding the compound (B) to a heated mixture of the compounds (A) and (C),
(3) A method comprising adding a heated mixture of the compounds (B) and (C) to the compound (A) in heated state, and
(4) A method comprising mixing the compounds (A), (B) and (C) together and heating the resulting mixture.

The order in which the compounds (A), (B) and (C) are added and mixed is not limited to the above, and in addition to these adding and mixing steps, reactions in which other energy sources are used may be employed.

By using any one of the aforesaid methods, the specific polyolefin type resins according to this invention may be easily obtained. Further, the aforesaid four methods may be carried out using sufficient heat to melt the compounds or using a solvent to dissolve the compounds therein.

For example, the method (1) using sufficient heat to melt the compounds, comprises melt mixing a polyolefin (A) with an α,β-ethylenically unsaturated carboxylic acid or anhydride thereof (B) at a temperature of 10°–100° C. higher than the softening point of the polyolefin (A) by the use of heating rolls or an extruder. It is desirable to control or adjust the time for the melt mixing depending on the kind of polyolefin (A) used; the melt mixing may usually be effected for 5–90 minutes. The metal compound (C) is then added to the heated mixture of the compounds (A) and (B). The metal compound (C) may preferably be fine (less than about 1µ, for example) in particle size for such addition as it is, however, the compound (C) having a larger particle size should be mixed with the other compounds by a suitable means to obtain a uniform mixture.

On the other hand, the aforesaid methods using a solvent are advantageous in cases where the unreacted materials are removed and the coloration of the product resin to be obtained should be avoided. The solvents used herein generally include aromatic hydrocarbons such as toluene, xylene and Solvesso (produced by Esso Company). For example, the polyolefin (A) and the α,β-ethylenically unsaturated carboxylic acid (B) in respective predetermined amounts are incorporated with xylene and then graft copolymerized in the presence of a polymerization initiator such as benzoyl peroxide (BPO).

In cases where the compounds (A) and (B) are to be mixed together in the presence of benzoyl peroxide, the compound (B) may be wholly, or in small portions, to the compound (A). The mixing under heat may be effected at 130°-140° C. for 30 minutes to 3 hours. It is desirable that the graft copolymer of the compounds (A) and (B) be washed thoroughly.

The graft copolymer is then incorporated with a metallic compound (C), mixed and heated for 15-60 minutes. It is desirable in this case that the metal compound (C) be swollen with, and dispersed in, a small amount of methanol, acetone, water or the like to form a dispersion which is then mixed with a solution of the resin (graft copolymer).

The specific polyolefin type resins may preferably include graft copolymers of a polyolefin and an α,β-ethylenically unsaturated carboxylic acid or anhydride thereof as well as such graft copolymers incorporated with a metal compound as previously mentioned. They may further include copolymers of ethylene for example and an α,β-ethylenically unsaturated carboxylic acid or anhydride thereof.

The specific polyolefin type resins (containing carboxyl groups or containing both carboxyl groups and metal compound) are strictly required to be not only adhesive but also hygienically safe for use as an adhesive in foodstuff packaging laminates. Thus, it is desirable that a specific polyolefin resin to be obtained be washed thoroughly with acetone, methyl ethyl ketone, ethyl acetate or the like during and after its synthesis. The specific polyolefin resin so obtained will exhibit excellent adhesiveness. Completion of the washing can be checked by confirming the absence of monomers, low-molecular-weight polymers or homopolymers of the α,β-ethylenically unsaturated carboxylic acid by the use of liquid chromatography (GPC). The specific polyolefin type resin so obtained is also excellent in adhesiveness.

The thus obtained polyolefin type resins may be used in the following various manners. They may be dissolved or dispersed in water, xylene, Solvesso (produced by Esso Company) or other aromatic hydrocarbons for their subsequent use; they may be extruded onto a substrate to be laminated thereon or inserted between two substrates by the use of an extruder; and they may be coated in powder form. The specific polyolefin resins are used as an adhesive layer or in the form of a plastic film.

The thermoplastic resin sheets or films used in this invention include polyolefin, polyamide, polyester, polyvinyl chloride, polyvinylidene chloride, polybutadiene, polycarbonate, ethylene-vinyl acetate copolymers and polyvinyl alcohol, each in sheet or film form. They also include composite sheets and films obtained for example by co-extruding at least two of the above resins. The preferable thermoplastic sheet or film which is the innermost layer of laminates for packaging foodstuffs, includes a sheet or film of a polyolefin such as polyethylene, polypropylene, ethylene-propylene copolymer or polybutene, as well as of a polyamide such as Nylon 12 or Nylon 11. These sheets or films are usually 10-1,000μ in thickness, may contain additives such as a filler and colorant or may be those which are printed or coated.

In this invention two or more thermoplastic resin sheets or films may be used as the innermost or outermost layer or both if required, and they may be made of the same resin or different resins respectively. One of them may be made of paper. Further, two or more thermoplastic resin sheets or films may also be used as the outermost layer with an adhesive.

The metal foils or sheets used in this invention include aluminum, tinplate, tin-free steel, black-plate and copper foils or sheets, and the thickness thereof is in the range of 5-1,000μ, preferably about 10-300μ although it varies depending on the purpose for which the foils or sheets are used. If necessary, they may be those having their surface subjected to suitable chemical treatment. In addition, they may be those having their surface printed for example.

The laminates according to this invention may be obtained by a process comprising the steps of:
(I) putting a thermoplastic resin sheet or film and a metal foil or sheet one upon another with a specific polyolefin type resin being interposed therebetween,
(II) heating the thus interposed specific polyolefin type resin to a temperature not lower than the melting point of the specific polyolefin type resin (this step being hereinafter referred to as "heat treatment") to form an intermediate laminate,
(III) placing a thermoplastic resin or paper sheet or film on the metal foil or sheet side of said intermediate laminate with an adhesive, which does not require to be heated to a temperature not lower than the melting point of said polyolefin type resin (such an adhesive being hereinafter referred to as "ordinary adhesive" for convenience's sake), being kept therebetween and, if desired,
further pressing the whole with or without heating, thereby to obtain the laminate according to this invention.

The term "intermediate laminate" used herein is intended to mean a laminate which is formed as an intermediate prior to the formation of a final laminate and in which the component materials are placed one upon another regardless of being bonded together or not.

The steps (I), (II) and (III) will be explained in more detail hereinbelow. Step (I):

There is no limitation on the step in which the materials to be laminated are placed one upon another to form an intermediate laminate. A few steps usable herein will be illustrated below.

(a) Either a specific polyolefin type resin is extruded by the use of an extruder or applied onto a metal foil or sheet, or a specific polyolefin type resin film is placed thereon and the whole is then heat treated or not, after which a thermoplastic resin sheet or film is placed on the thus extruded or applied specific polyolefin type resin or on the specific polyolefin type resin film to form an intermediate laminate.

(b) A specific polyolefin type resin is coated on a thermoplastic resin sheet or film, or a film of the former is placed on the latter, and the whole is heat treated or not, after which a metal foil or sheet is placed on the coated specific polyolefin type resin side.

(c) A thermoplastic resin sheet or film and a specific polyolefin type resin are co-extruded to obtain a double layer, and a metal foil or sheet is placed on the specific polyolefin type resin side of the thus obtained double layer.

(d) A specific polyolefin type resin is melt extruded into between a thermoplastic resin sheet or film and a metal foil or sheet by the use of an extruder to form a specific polyolefin type resin film therebetween thereby forming an intermediate sandwich laminate. Step (II):

The heat treatment may be effected by conduction heating (by means of heating rolls, heating plates or the like), infrared ray irradiation, blowing of heated gases, induction heating or a combination of at least two of the aforesaid heating means. Any other heating means may also be used as far as they can afford heat treatment at a temperature not lower than the melting point of the specific polyolefin type resin. In view of the desirability for a continuous heating operation, heating rolls or induction heating may preferably be used as a heating means. In addition, pressing is usually carried out at the same time with heating and, for this reason, heating rolls may more preferably be used. If heat treatment with heating rolls is carried out in said Step (I)(d) for sandwich lamination, then pressing and heat treatment of the materials to be laminated will advantageously be effected almost simultaneously. The pressing and heat treatment may of course be carried out separately.

In the heat treatment the temperature must be not lower than the melting point of a specific polyolefin type resin used and is usually in the range of about 120°–250° C. although it varies depending on the kind of the specific polyolefin type resin. Further, the temperature for the heat treatment may be as high as possible so long as it does not have any adverse effects (decomposition and degradation) on the properties of the specific polyolefin type resin and the thermoplastic resin sheet or film.

The time for the heat treatment may be a time in which are melted at least the specific polyolefin type resin portions contacting with thermoplastic resin sheet or film and/or the metal foil or sheet.

It is preferable that heating for the heat treatment is effected at the metal foil or sheet. The reason for this is that if the heating is carried out at the thermoplastic resin sheet or film side by the use of heating rolls, the thermoplastic resin sheet or film not only tends to be partly stuck to, and consequently partly torn off by, the heating rolls but also tends to be degraded.

A pre-heating or pre-cooling step may additionally be included in the process of this invention.

A strong or secure bond may be effected among the component materials of a laminate by heat treatment. Step (III):

The ordinary adhesives used herein include various kinds of adhesives. In the manufacture of laminates according to this invention, the ordinary adhesives may be used as an outer layer with respect to the metal foil or sheet of the resulting laminate; therefore, the ordinary adhesives will not raise problems as to hygienic unsafety even if the laminates are used for packaging foodstuffs.

The ordinary adhesives used herein may be those which do not require heating at a temperature not lower than the melting point of the specific polyolefin type resin to exhibit necessary bond strength. They include urethane type adhesives, epoxy type adhesives, vinyl type adhesives, acryl type adhesives and rubber type adhesives, each in non-solvent form, in the form of a solution or dispersion in an organic solvent, in aqueous solution form or in aqueous dispersion form. The urethane type adhesives are preferred and they may be in the form of a solution in an organic solvent, in non-solvent form (two component form, moisture cure form) or in other suitable forms. Further, adhesives which may be heated to temperatures below 100° C., may also be used.

The ordinary adhesives may be roll-coated, gravure-coated, spray-coated, curtain-coated or air knife-coated for example, or they may be applied in film form.

The lamination step (III) will be illustrated below.

(a) The intermediate laminate obtained by the practice of Steps (I) and (II) is coated at the metal foil or sheet side with the ordinary adhesive. Then, at least one member selected from the group consisting of thermoplastic resin sheets or films and paper sheets is laminated onto the adhesive coated metal foil or sheet. Alternatively, the ordinary adhesive may peliminarily formed to a film which is then attached to the metal foil or sheet. In practicing these lamination, there may be additionally used heating at a temperature lower than the melting point of the specific polyolefin type resin as required.

(b) A thermoplastic film and an ordinary adhesive, which are co-extrudable, are extruded to form a laminate which is then laminated at the adhesive side onto the metal foil or sheet obtained by practicing Steps (I) and (II); this lamination may be carried out under heat as required.

(c) An ordinary adhesive is coated on at least one member selected from the group consisting of thermoplastic resin sheets or films and paper sheets to form an intermediate laminate which is then laminated at the coated adhesive side onto the metal foil or sheet of the intermediate laminate obtained by practicing Steps (I) and (II), thereby to obtain a final laminate. The term "final laminate" used herein is intended to mean one in which the component materials are bonded together.

The final laminates according to this invention may be obtained by the process comprising the steps (I), (II) and (III), however, this invention is not limited to this process.

In cases where the final laminates according to this invention are manufactured by practicing Steps (I), (II) and (III) in this order, heat treatment may be carried out very effectively. More particularly, the final laminate of this invention is composed of the first to fifth layers as indicated below:

thermoplastic resin sheet or film (1st layer)/specific polyolefin type resin (2nd layer)/metal foil or sheet (3rd layer)/ordinary adhesive (4th layer)/at least one member selected from thermoplastic resin sheets or films or paper (5th layer).

Thus, the portions of a "1st layer/2nd layer/3rd layer" intermediate laminate, which require heating, may be effectively heat treated by carrying out Steps (I), (II) and (III) in this order. If these Steps be carried out in the order of (III), (I) and (II), that is, if a "3rd layer/4th layer/5th layer" intermediate laminate is firstly prepared and the 1st layer is laminated onto the 3rd layer of the intermediate laminate using the 2nd layer (as the adhesive) therebetween, then the 4th and 5th layers inherently requiring no heat treatment will unnecessarily be heated by heat treatment which is necessary only for lamination of the 1st layer with the 3rd layer with the 2nd layer therebetween in order to strengthen a bond among these three layers. As the result of this heat treatment which is unnecessary for the 4th and 5th layers, not only is a heat loss incurred, but also these two layers are degraded depending on their quality. Further, it is necessary to give heat through the 5th layer towards the 1st layer depending on a heating means used. In this case, high-temperature heating is required to heat the "1st layer/2nd layer/3rd layer" portion, particularly the "2nd layer/3rd layer" portion, to a temperature not lower than the lowest necessary temperature, with the result that not only are heat losses and degradation of the layers incurred but also problems are raised as to rendering it impossible to heat treat the necessary layers at a high rate. In addition, if an ink layer is to be included in a laminate to be prepared, such high-temperature heating will raise a problem as to degradation of the ink. The aforesaid problems may be solved by practicing Steps (I), (II) and (III) in this order according to this invention.

The final laminates obtained by the process of this invention are useful for packaging foodstuffs therein and are used as material for making pouches as well as side, top and bottom walls of packaging containers therefrom, thus obtaining packaging containers which are excellent in hygienic property, barrier property, bond strength after retort sterilization, and the like. If there are prepared containers the thickness of structural material of which is large, then they will have further improved compression-resistant property. The containers include pouches and cans.

Containers made from the laminates according to this invention are excellent in compression resistance and hygienic safety due to the use of a polyolefin sheet or film as the innermost layer thereof and are also excellent in barrier property due to the use of a metal foil or sheet as one of the layers thereof. Further, strong bond strength may be obtained by heat treating a specific polyolefin type resin in a short time in the preparation of laminates according to this invention and, therefore, there is raised no problem as to the deformation of the resulting laminates even if the heat treatment is carried out for a long time. If a polyolefin film, polyester film, polyamide film or polyolefin coated paper is used as the outermost layer in the preparation of laminates and the laminates so prepared are used in the preparation of containers, the resulting containers will have excellent tensile strength and impact resistance.

This invention will be better understood by the following Examples wherein all the parts are by weight unless otherwise specified.

EXAMPLE 1

One hundred (100) parts of polypropylene (M.I. 10), 20 parts of maleic anhydride and 375 parts of xylene are introduced into a one-liter, three-necked flask provided with an inlet for nitrogen gas, thermometer and agitator. The resulting mixture in the flask is heated to 130° C. under agitation in a nitrogen gas atmosphere, incorporated dropwise with a solution of 0.1 part benzoyl peroxide in 40 parts of xylene over a period of time of 90 minutes, thereafter heated to 130° C. under agitation for 60 minutes and then cooled to ambient temperature in 60 minutes thereby to obtain a suspension. The suspension so obtained is filtered, freed of the xylene, washed a few times with methyl ethyl ketone to the extent that maleic anhydride and reaction products thereof are hardly be appreciated in the methyl ethyl ketone washings by liquid chromatography (GPC). The thus obtained polypropylene-maleic anhydride copolymer resin (maleic acid graft ratio: 0.6%) in powder form is air dried, mixed with 1.5 parts of aluminum hydroxide, melted and extruded at 180° C. by the use of an extruder to obtain pellets of the specific polyolefin type resin (melting point, 163° C.; method for measurement, DTA 10° C./min., amount of test sample used, 10 mg) and then further extruded by the use of an extruder (temp. of dies, 240° C.; temp. of resin, 210° C.) to obtain $20\mu$ thick films.

The thus obtained films are each placed on a $15\mu$ thick aluminum foil by the use of a laminate (190° C.) to obtain an intermediate laminate. A $70\mu$ thick polypropylene film (CPP) is placed on the specific polyolefin type resin of each of the intermediate laminates and the whole is heated at the aluminum foil side for a contact time of one second for heat treatment thereof by the use of a heating roll (having a metal surface) at 200° C. to obtain a three-layer intermediate laminate.

Some of the thus obtained three-layer intermediate laminates were each heat treated not at the aluminum foil side but at the polypropylene film (CPP) side for heat treatment of the three-layer laminate by the use of a heating roll; in this case, the CPP was partly stuck to, and consequently torn off by, the heating roll (non-coated). The same procedure as above was followed except that a fluorine resin-coated heating roll was substituted for said non-coated heating roll, with the result that satisfactory heat treatment could be carried out. Hereinafter, the metal foil or sheet side is heated for effecting the intended heat treatment unless otherwise explained.

The aforesaid three-layer intermediate laminate is coated to a depth of about 5 $\mu$m with a urethane type adhesive in the form of a solution in an organic solvent (this adhesive being produced under the trademark of AD-506 by Toyo Morton Co., Ltd.) by the use of a gravure coater and then laminated at the aluminum foil side with a $12\mu$ thick polyester film dried with heated air at 80° C., by the use of a laminator (about 30° C.) to obtain a final laminate.

Using the thus obtained final laminate as the material for containers (pouches) and a heat sealing technique, there were obtained open top containers with their innermost layer being the polypropylene film. The open top containers so obtained were each packed with a certain material, heat sealed at the open top with a top wall of the same final laminate with its innermost layer being the polypropylene film and tested as indicated in Table 2.

EXAMPLE 2

A $15\mu$ thick aluminum foil and a $70\mu$ thick polypropylene film were overlapped each other with the pellets of specific polyolefin type resin of Example 1 being sandwiched in therebetween, after which the whole was heat treated by the use of a heating roll to effect sandwich lamination thereby obtaining an intermediate laminate. The thickness of the specific polyolefin type resin in the thus obtained intermediate laminate was $20\mu$. The intermediate laminate was then laminated at the aluminum foil side with a polyester film using a urethane type adhesive therebetween in the same manner as in Example 1 thereby to obtain a final laminate.

EXAMPLE 3

A urethane type adhesive was gravure coated on the ink layer (the ink being a gravure ink produced under the registered trademark of LAMIPACK by Toyo Ink Mfg. Co., Ltd.) attached to one side of a $12\mu$ thick polyester film. The film so treated was laminated with the same polypropylene film/specific polyolefin type resin/aluminum foil intermediate laminate as obtained in Example 2 in such a manner that the adhesive-coated ink layer of the polyester film faced to the aluminum foil side of the intermediate laminate, thereby to obtain a final laminate. It was not appreciated that the polyester film of the final laminate was yellowed and embrittled due to thermal degradation. The color of the ink layer of the final laminate was not faded, either.

EXAMPLE 4

The same specific polyolefin type resin and Nylon 12 as used in Example 1 were co-extruded to obtain a co-extruded film in which the polyolefin type resin and the Nylon 12 were 10μ and 200μ thick respectively. A 30μ thick aluminum foil was placed on the specific polyolefin type resin side of the thus obtained co-extruded film and the whole was then heated at the aluminum foil side for 1.0 second for heat treatment thereof by the use of a hot press at a surface temperature of 230° C. to obtain an intermediate laminate. The thus obtained intermediate laminate was laminated with a 150μ thick Nylon 12 film with an ink layer attached to the surface thereof using an epoxy type adhesive (produced under the trademark of AD-70 and QH-3 by Toyo Morton Co., Ltd.) gravure-coated on said ink layer, in such a manner that the aluminum foil side of the intermediate laminate faced to the ink layer of the Nylon 12 film thereby to obtain a final laminate. The thus obtained final laminate was cut into rectangular pieces which were then curled with the Nylon 12 film facing inside. The pieces so curled were lap sealed at the cut edges with a 40μ thick Nylon 12 film strip to obtain a cylindrical side wall for a container. Separately, a 100μ thick aluminum foil was laminated with a 70μ thick Nylon 12 film using a specific polyolefin type resin therebetween by the use of a heating roll in the same manner as above thereby to obtain a laminate for use as material for top and bottom walls of the container. The side and bottom walls so obtained were heat sealed to form a soft open top container. The open top containers so formed were each packed with a certain material, heat sealed at the open top with a top wall and then tested as indicated in Table 2.

EXAMPLE 5

The procedure of Example 4 was followed except that polypropylene was substituted for the Nylon 12 in the production of co-extruded films, thereby to obtain a final laminate. The thus obtained laminate was treated as in Example 4 to obtain curled pieces. The thus obtained curled pieces were each lap sealed at the cut edges with a tape (width: 8 mm) of the same specific polyolefin type resin as used in Example 1 to obtain a cylindrical side wall for a container.

In addition, the same "polypropylene/specific polyolefin type resin/aluminum foil" intermediate laminate as obtained in Example 1 was cut into circular pieces which were inserted into dies where a specific polyolefin type resin in molten state would be flowed over the aluminum foil side of the circular piece at the time of injection moulding. Then, the specific polyolefin type resin molten at 200° C. was injected into the circular piece-charged dies to obtain top and bottom walls for the container. The top and bottom walls were of the same shape.

The cylindrical side and bottom walls so obtained were bonded together, packed with a certain material and then sealed with a top wall, by the use of an induction heating apparatus. The closed containers so obtained were tested as indicated in Table 2.

EXAMPLES 6–16

Using each of the specific polyolefin type resins shown in the following Table 1 and following the procedure of Example 5, there was obtained a final laminate which was then treated to obtain containers. The containers so obtained were tested as indicated in the following Table 2. In cases where the specific polyolefin type resin used was a polyethylene-based one, polyethylene was used in place of the polypropylene used in the co-extrusion.

TABLE 1

| | Example | | | | | | | | | | |
|---|---|---|---|---|---|---|---|---|---|---|---|
| | 6 | 7 | 8 | 9 | 10 | 11 | 12 | 13 | 14 | 15 | 16 |
| Kind of specific polyolefin type resin and Method for preparation thereof | Polypropylene-maleic anhydride graft polymer (0.6% graft) Solvent method | Polypropylene-maleic anhydride graft polymer (0.6% graft) Solvent method | Polypropylene-maleic anhydride graft polymer (0.8% graft) Solvent method | Polypropylene-acrylic acid graft polymer (0.9% graft) Solvent method | Polypropylene-acrylic acid graft polymer (0.9% graft) Solvent method | Polyethylene-maleic anhydride graft polymer (1.5% graft) Solvent method | Polyethylene-acrylic acid graft polymer (2.0% graft) Solvent method | Ethylene-acrylic acid copolymer (acrylic acid, 1.0% copolymerization) Solvent method | Polypropylene-maleic anhydride graft polymer (0.6% graft) Solvent method | Polyethylene-acrylic acid graft polymer (0.9% graft) Solvent method | Ethylene-maleic acid copolymer (Maleic acid, 1.0% copolymerization) Solvent method |
| Solvent for washing specific polyolefin type resin | Methyl ethyl ketone | Methyl ethyl ketone | Acetone | Acetone | Methyl ethyl ketone | Acetone | Methyl ethyl ketone | Methyl ethyl ketone and ethanol | Methyl ethyl ketone | Acetone and Ethanol | Ethyl acetate |
| Kind of metal compound and Amount (Parts) thereof contained in specific polyolefin type | Aluminum oxide 1.0 | Aluminum carbonate 1.5 | Zinc oxide 0.5 | Aluminum hydroxide 0.9 | Zinc oxide 1.5 | Aluminum hydroxide 1.2 | Aluminum oxide 0.3 | Sodium hydroxide 0.3 | None | None | None |

EXAMPLE 17

The procedure for the preparation of a specific polyolefin type resin in Example 1 was followed except that polyethylene was substituted for the polypropylene, thereby to obtain a specific polyolefin type resin (melting point: 134° C.).

The thus obtained specific polyolefin type resin was melt extruded into between a 70μ thick polyethylene film and a 15μ thick aluminum foil for sandwich lamination, and the resulting intermediate laminate was contacted at the aluminum foil side for 0.6 seconds with a heating roll at a surface temperature of 200° C.

Then, polyethylene-coated paper was laminated onto the aluminum foil side of the intermediate laminate using a urethane type adhesive (AD-506) therebetween to obtain a final laminate.

From the thus obtained final laminate, containers (pouches) were made with the polyethylene film being the innermost layer thereof.

EXAMPLE 18

The same specific polyolefin type resin as obtained in Example 1 and polypropylene containing 30% by weight of titanium oxide were co-extruded to produce a co-extruded film in which the polypropylene layer and the specific polyolefin type resin layer were 700μ and 10μ thick respectively. A 40μ thick steel foil was lapped over the specific polyolefin type resin side of the co-extruded film so produced and the while was then heat treated by an induction heating apparatus (430 KHz, 5 KV, 0.3 seconds) to obtain an intermediate laminate. Then, a 40μ thick polypropylene film with 30 wt.% titanium oxide contained therein and an ink (LAMIPACK) layer formed thereon was laminated with the thus obtained intermediate laminate using a urethane type adhesive (AD-506) therebetween in such a manner that the ink layer-free side of the propylene film faced to the steel foil side of the intermediate laminate, thereby to obtain a final laminate. The thus obtained final laminate was cut into rectangular pieces which were each lap sealed at the cut edge portion with a 40μ thick polypropylene film tape with the co-extruded film being the innermost layer by the use of an induction heating apparatus thereby to obtain a cylindrical side wall for a container. In addition, the same "polypropylene/specific polyolefin type resin/aluminum foil" intermediate laminate as obtained in Example 1 was cut into circular pieces which were inserted into dies where a molten specific polyolefin type resin would flow over the inserted pieces at the time of injection moulding. A specific polyolefin type resin molten at 200° C. was injected into the dies in which said circular pieces were inserted, thereby to obtain top and bottom walls for the container.

The side wall and the lid so obtained were bonded together by the use of an induction heating apparatus to obtain a container which was treated to form a closed container. The containers so obtained were tested as indicated in the following Table 2.

EXAMPLE 19

The procedure of Example 18 for obtaining the intermediate laminate was followed except that a 15μ thick aluminum foil and titanium oxide-free polypropylene were substituted respectively for the steel foil and titanium oxide-containing polypropylene. The whole was heat treated by the use of a heating roll at a surface temperature of 230° C. to obtain a "polypropylene (700μ thick)/specific polyolefin type resin (10μ thick)/aluminum foil (15μ thick)" intermediate laminate. Then, a 60μ thick OPP film having its one side rendered heat sealable was laminated with the thus obtained intermediate laminate using a urethane type adhesive (produced under the trademark of AD-503 by Toyo Morton Co., Ltd.) therebetween in such a manner that the non-heat sealable side of the OPP film faced to the aluminum foil side of the intermediate laminate, thereby to obtain a final laminate.

The thus obtained final laminate was cut into rectangular pieces which were each curled with the OPP film being kept outside and then lap sealed at the cut edges with a 40μ thick polypropylene film tape to obtain a cylindrical side wall for a container. The thus obtained side wall and the same lid as obtained in Example 18 were bonded together by the use of an induction heating apparatus to obtain a container.

EXAMPLE 20

The procedure of Example 19 was followed except that a mixture of 70 wt.% specific polyolefin type resin with 30 wt.% polypropylene was substituted for the specific polyolefin type resin, thereby to obtain a "polypropylene (70μ thick)/mixture of specific polyolefin type resin (10μ thick)/aluminum foil (15μ thick)" intermediate laminate which was then treated as in Example 18 thereby to obtain a container.

COMPARATIVE EXAMPLE 1

The procedure of Example 1 was followed except that a urethane type adhesive (AD-506) was substituted for the specific polyolefin type resin, a polypropylene film and an aluminum foil were bonded together using the adhesive therebetween, and a polyester film is bonded to the free side of the aluminum foil using the adhesive therebetween, thereby to obtain a final laminate.

The thus obtained laminate was treated as in Example 1 to produce a container (pouch) which was then tested as indicated in the following Table 2.

COMPARATIVE EXAMPLE 2

A 15μ thick aluminum foil was laminated onto an ink (LAMIPACK) layer attached to a 12μ thick polyester film using a urethane type adhesive (AD-506) therebetween thereby to produce an intermediate laminate. Then, the thus produced intermediate laminate was laminated at the aluminum foil side with a specific polyolefin type resin and further with a polypropylene film by the use of a heating roll as in Example 1 to obtain a final laminate. It was found that the polyester film of the final laminate was yellowed and embrittled due to thermal degradation and the color of the ink was faded.

COMPARATIVE EXAMPLE 3

Varying the order in which such a final laminate as obtained in Example 4 was manufactured, a 30μ thick aluminum foil was laminated with the ink layer of an ink layer-attached 150μ thick Nylon 12 film using the epoxy type adhesive of Example 4 therebetween thereby to obtain an intermediate laminate. The thus obtained intermediate laminate was lapped over a co-extruded film composed of a 10μ thick specific polyolefin type resin and 200μ thick Nylon 12 in such a manner that the aluminum foil side of the intermediate laminate faced to the specific polyolefin type resin side of the co-extruded film, after which the whole was heat treated at the co-extruded film side for a contact time of one second by the use of a hot press at a surface temperature of 230° C. with the result that the whole could not be bonded together, that is, final lamination thereof was impossible. The whole so heat treated was further heat treated for a total time of 10 seconds with the result that the co-extruded film could not be finally laminated with sufficient bond strength and the color of the ink was faded. In addition, the heat treatment for 10 seconds caused the film to deform due to its melting. As compared with the fact that the heat treatment in Example 4 was carried out efficiently thereby obtaining a strong bond, the heat treatment in Comparative Example 3 (lamination order being changed) was carried out inefficiently with its attendant fading of the ink and, further, it could not be carried out if the hot press used was not one the surface of which was coated with Teflon.

COMPARATIVE EXAMPLE 4

The lamination order in Example 19 was changed. More particularly, the procedure of Example 19 was followed except that a 15μ thick aluminum foil was laminated onto the non-heat sealable side of a 60μ thick OPP film having its one side rendered heat sealable, using a urethane type adhesive (AD-506) therebetween to form an intermediate laminate. Then, a "polypropylene (700μ thick)/specific polyolefin type resin (10μ thick)" co-extruded film was attempted to be laminated at the specific polyolefin type resin side with the OPP film by the use of a Teflon-coated heating roll at a surface temperature of 230° C. with the result that a desired final laminate could not be obtained since the OPP film shrank.

innermost film (contacting with the noodles) and the metal foil or sheet was measured.

Amount of potassium permanganate consumed:

Each container was charged with purified water and then sterilized in a retort at 120° C. for 2 hours. The thus treated water (as the contents) was measured for amount of potassium permanganate consumed.

Rupture strength:

Each final laminate was tested for rupture strength by the use of Muhlen rupture strength tester in accordance with Ordinance No. 17 of the Welfare Ministry of Japan.

What is claimed is:

1. A process for preparing a final laminate comprising the steps of:

putting a thermoplastic resin sheet or film and a metal foil or sheet one upon another with a specific polyolefin type resin being interposed therebetween, the specific polyolefin type resin being at least one member selected from the group consisting of carboxyl group-containing polyolefin resins and metal compound-added carboxyl group-containing polyolefin resins, heating the thus interposed specific polyolefin type resin through the metal foil or sheet to a temperature not lower than the melting point of the specific polyolefin type resin to obtain an intermediate laminate and laminating at least one member selected from the group consisting of paper and thermoplastic sheets or films, on the metal foil or sheet side of said intermediate laminate using therebetween an ordinary adhesive which does not require to be heated to a temperature not lower than the melting point of said specific polyolefin type resin at the time of lamination, thereby to obtain a final laminate.

2. A process for preparing a final laminate according to claim 1, wherein the specific polyolefin type resin is one prepared by graft copolymerizing a polyolefin and an α,β-ethylenically unsaturated carboxylic acid to produce a graft copolymer and then adding a metal compound to the thus produced graft copolymer.

TABLE 2

| | Example | | | | | | | | | | | | | | | | | Comparative Example | |
|---|---|---|---|---|---|---|---|---|---|---|---|---|---|---|---|---|---|---|---|
| | 1 | 2 | 4 | 5 | 6 | 7 | 8 | 9 | 10 | 11 | 12 | 13 | 14 | 15 | 16 | 18 | 1 | 3 |
| Bond strength before retort sterilization g/15mm wide | At least 1500 | At least 1500 | At least 1500 | At least 1500 | 1270 | 1200 | 1190 | 1380 | 1150 | At least 1500 | 1330 | 1060 | 1080 | 1010 | 980 | At least 1500 | 970 | 700 |
| Bond strength after retort sterilization (g/15mm wide) Immediately after retort sterilization | At least 1500 | At least 1500 | At least 1500 | At least 1500 | 1060 | 1030 | 960 | 1120 | 940 | At least 1500 | 1090 | 510 | 970 | 820 | 490 | At least 1500 | 890 | 580 |
| After preserved at 66° C. for 2 weeks | 1200 | 1210 | 1320 | 1310 | Not tested | Not tested | Not tested | Not tested | Not tested | 1090 | Not tested | Not tested | Not tested | Not tested | Not tested | 1300 | 430 | Delamination |
| Amount of potassium permanganate consumed (ppm) | 0.23 | 0.22 | 0.31 | 0.27 | 0.31 | 0.39 | 0.36 | 0.51 | 0.47 | 0.29 | 0.44 | 0.53 | 0.41 | 0.50 | 0.42 | 0.27 | 5.1 | 0.31 |
| Rupture strength (Kg/cm$^2$) | 4.2 | 4.15 | At least 12 | At least 12 | At least 12 | At least 12 | At least 12 | At least 12 | At least 12 | At least 12 | At least 12 | At least 12 | At least 12 | At least 12 | At least 12 | At least 12 | 4.0 | At least 12 |

Regarding Table 2:

Bond strength:

Each container was charged with seasoned Chinese noodles produced by A Company, and then sterilized in a retort at 125° C. for 10 minutes. Immediately after the retort sterilization and after two weeks' acceleration test at 66° C. thereafter, the bond strength between the 3. A process for preparing a final laminate according to claim 2, wherein the polyolefin is a crystalline polyolefin.

4. A process for preparing a final laminate according to claim 2 or 3, wherein the specific polyolefin type resin is such a purified one that the unreacted $\alpha,\beta$-ethylenically unsaturated carboxylic acid and low-molecular-weight polymers are substantially not detected therefrom by liquid chromatography.

5. A process for preparing a final laminate according to claim 4, wherein the purification is effected by washing with an organic solvent and/or water.

6. A process for preparing a final laminate according to any one of claims 1, 2, or 3, wherein the specific polyolefin type resin contains 100 parts by weight of the carboxyl group-containing polyolefin resin and 0.05–10 parts by weight of the metal compound.

7. A process for preparing a final laminate according to claim 4, wherein the specific polyolefin type resin contains 100 parts by weight of the carboxyl group-containing polyolefin resin and 0.05–10 parts by weight of the metal compound.

8. A process for preparing a final laminate according to claim 6, wherein the metal compound is an aluminum compound.

9. A process for preparing a final laminate according to claim 7, wherein the metal compound is an aluminum compound.

10. A process for preparing a final laminate according to claim 8, wherein the $\alpha,\beta$-ethylenically unsaturated carboxylic acid is maleic anhydride and the aluminum compound is aluminum hydroxide.

11. A process for preparing a final laminate according to any one of claims 1–3, wherein the thermoplastic resin sheet or film is a polyolefin or polyamide sheet or film.

12. A process for preparing a final laminate according to any one of claims 1–3, wherein the heating to a temperature not lower than the melting point of the specific polyolefin type resin is effected by contacting a heating roll with the metal foil or sheet side.

13. A process for preparing a final laminate according to any one of claims 1 or 3, wherein the specific polyolefin type resin is melt extruded in film form between the thermoplastic resin sheet or film and the metal foil or sheet for carrying out sandwich lamination.

14. A process for preparing a final laminate according to claim 12, wherein the specific polyolefin type resin is melt extruded in film form between the thermoplastic resin sheet or film and the metal foil or film for carrying out sandwich lamination.

15. A process for preparing a final laminate according to any one of claims 1 or 3, wherein the thermoplastic resin sheet or film is a polyolefin, polyester, linear polyamide, ethylene-vinyl acetate copolymer, polybutadiene, polyvinyl chloride, polyvinylidene chloride or polycarbonate sheet or film, or is paper.

16. A process for preparing a final laminate according to claim 15, wherein the thermoplastic resin sheet or film is one having an ink layer printed on the inner surface thereof.

17. A process for preparing a final laminate according to claim 15, wherein the ordinary adhesive is at least one member selected from the group consisting of urethane type adhesives and epoxy type adhesives.

18. A process for preparing a final laminate according to claim 17, wherein the ordinary adhesive is in the form of a solution in an organic solvent.

19. A container for packaging foodstuffs, manufactured from the final laminate prepared by the process of any one of claims 1, 2 or 3, wherein the innermost thermoplastic resin sheet or film is a polyolefin resin sheet or film.

20. A process for preparing a final laminate according to claim 15, wherein the thermoplastic resin sheet or film is one having an ink layer printed on the outer surface thereof.

* * * * *